(12) United States Patent
Chen et al.

(10) Patent No.: US 8,944,182 B2
(45) Date of Patent: Feb. 3, 2015

(54) SUCTION MODULE AND HAND-HELD POWER TOOL WITH A SUCTION MODULE

(75) Inventors: Henry Chen, Shanghai (CN); Sean Wang, Shanghai (CN); Torsten Luettich, Kaufering (DE); Matthias Kuemmerle, Pfaeffikon (CH); Bernhard Link, Schwabbruck (DE)

(73) Assignee: Hilti Aktiengesellschaft, Schaan (LI)

( * ) Notice: Subject to any disclaimer, the term of this patent is extended or adjusted under 35 U.S.C. 154(b) by 529 days.

(21) Appl. No.: 13/329,776

(22) Filed: Dec. 19, 2011

(65) Prior Publication Data
US 2012/0318553 A1 Dec. 20, 2012

(30) Foreign Application Priority Data
Dec. 20, 2010 (DE) .......................... 10 2010 063 515

(51) Int. Cl.
*B25D 17/14* (2006.01)
*B23Q 11/00* (2006.01)

(52) U.S. Cl.
CPC .................................. *B23Q 11/0046* (2013.01)
USPC ......................................................... 173/198

(58) Field of Classification Search
USPC ............................. 173/78, 130, 106, 198, 217
See application file for complete search history.

(56) References Cited

U.S. PATENT DOCUMENTS

| | | | |
|---|---|---|---|
| 5,129,467 A * | 7/1992 | Watanabe et al. ................ | 173/75 |
| 2004/0263008 A1* | 12/2004 | Voigt et al. ...................... | 310/58 |
| 2011/0147030 A1* | 6/2011 | Blum et al. .................... | 173/216 |
| 2011/0308830 A1* | 12/2011 | Furusawa et al. ............. | 173/198 |
| 2012/0273243 A1* | 11/2012 | Tada et al. ...................... | 173/198 |
| 2012/0298391 A1* | 11/2012 | Kakiuchi et al. ................ | 173/77 |

FOREIGN PATENT DOCUMENTS

EP     1 240 976 A1     9/2002

* cited by examiner

*Primary Examiner* — Robert Long
(74) *Attorney, Agent, or Firm* — Crowell & Moring LLP

(57) ABSTRACT

A suction module which can be connected to a hand-held power tool, and a hand-held power tool including the suction module, is disclosed. The suction module includes a suction head which can receive a tool of the hand-held power tool that is rotatable around a tool axis and a fan with a fan wheel that is rotatable around a fan axis for suctioning air from the suction head. The suction head is connected to the fan by an intake channel, which in a first section runs along a longitudinal axis of the suction module and in a second section along a vertical axis of the suction module that is fixed transverse to the longitudinal axis. The fan axis runs parallel to a narrow axis, which is aligned transverse to the longitudinal axis and transverse to the vertical axis.

15 Claims, 2 Drawing Sheets

SUCTION MODULE AND HAND-HELD POWER TOOL WITH A SUCTION MODULE

This application claims the priority of German Patent Document No. 10 2010 063 515.4, filed Dec. 20, 2010, the disclosure of which is expressly incorporated by reference herein.

BACKGROUND AND SUMMARY OF THE INVENTION

The invention relates to a suction module and also to a hand-held power tool that includes a suction module.

This type of suction module is used in particular to suck away dust, splinters, chips, concrete parts or other material, which is normally released when processing materials with a hand-held power tool and which, if not suctioned off, can cause contamination, endanger the health of operators or be an explosion hazard. As a result, the accruing material is frequently suctioned off by the suction head directly at the processing location.

Removable suction modules for a hand-held power tool, such as a hammer drill or combination hammer for example, have become known in the past in various manifestations, among them those that have a blower wheel or fan wheel, a filter and an air-conducting fluid path (sections of which are also particle-charged) in common in a housing unit. The blower wheel or fan wheel is driven by an integrated motor or by the motor situated in the hammer drill and combination hammer via a shaft-hub connection.

In the case of the cited suction modules, even those with integrated motors, the rotational axes of the blower wheel or the fan wheel and the motor are typically always arranged parallel to the rotational axis of the motor in the hammer drill and combination hammer.

In addition, contemporary suction modules have a long air path from the borehole or the drill bit to the blower wheel with a lot of changes in direction. Contemporary suction modules blow the air after the blower wheel to the outside into the environment without an appreciable delay.

This type of suction module is shown for example in European Patent Document No. EP 120976 A1. It features a suction head, which is normally situated at a location at which dust or such evacuation material is released during processing by a hand-held power tool. The suction head is connected via a suction hose to a suction fan in a suction housing, which can draw off air from the suction head. The suction fan has a rotational axis, which runs in the direction of a tool axis of the hand-held power tool. The radial extension of the suction fan is therefore restricted by the extension of a narrow side of the suction housing, which likewise restricts a suction power of the suction fan.

It is desirable to achieve an improved suction power of the suction fan with construction space that is nevertheless reasonably limited.

The invention comes into play at this point and its object is to disclose an improved suction module with respect to the prior art. In particular, a suction module for an improved suction power with construction space that is nevertheless reasonably limited is configured.

According to a consideration of the invention, especially great suction power, i.e., high volume flows and/or high negative pressure, requires, for specific applications, appropriately dimensioned fans and motors that are efficient above all, as well as short air paths that are beneficial for flow. As a rule, great suction power requires fan wheels with larger diameters or greater rotational speeds with efficient air guidance after the fan wheel.

The invention is also based on the consideration that the radial extension of a fan in the prior art is routinely restricted by the smallest outer dimension of the suction housing of the suction module. The invention also assumes that, in the case of a rotational axis of a fan wheel which runs in the direction of a tool axis of the hand-held power tool, a narrow side of the suction housing causes a limitation of the suction power in this respect. The invention has recognized that the fan may have a greater radial extension, if a fan axis of the fan wheel is arranged running along the narrow axis. The advantage of the inventive idea is that a radial extension of a fan wheel or fan in the case of a suction module according to the invention is virtually no longer restricted by an area of smaller dimension in the direction of the narrow axis. In fact, according to the idea of the invention, an area is now available for a radial dimension of the fan wheel which is specified by the dimensions of the side surfaces of the suction housing that are much greater as compared to the area of smaller dimension in the direction of the narrow axis, that is, in particular, a larger area specified by the dimensions of the suction housing along a vertical axis and longitudinal axis. A larger fan having a greater suction power may be installed advantageously.

The narrow axis is aligned to transverse the longitudinal axis and transverse the vertical axis, whereby it normally runs along a narrow side of the main module. The narrow axis does not absolutely have to be localized on the suction module, rather we are dealing merely with an abstract coordinate axis. Therefore, it is also not mandatory that a component or an edge of the suction module, apart from the fan axis, run parallel to the narrow axis.

Because of the alignment of the fan axis parallel to the narrow axis, the fan axis runs parallel to a narrow side of the suction module in common designs of a suction module. Such a narrow side is a rear side in particular, which forms a side facing away from the suction head. Because of the position of the fan axis parallel to the narrow axis, the fan wheel may be extended as far as the dimensions of a side surface of the suction module permit, which in particular are greater than the narrow side of the suction module. This allows a larger and therefore also more powerful fan wheel to be used.

The suction module according to the idea of invention provides the basis for an especially compact design.

Further developments of the invention can be found in the description and indicate in detail advantageous possibilities of realizing the idea explained above as related to the stated problem as well as with respect to additional advantages.

For example, the hand-held power tool may have a chuck in which a tool may be clamped. A tool of this sort is a drill bit for example. This type of drill may typically be rotatable around a tool axis by the hand-held power tool, which is why for example an electric motor or a combustion motor is provided in the hand-held power tool.

The suction head is constructed in particular in such a way that the rotatable tool passes through the suction head, which means, in other words, that parts of the suction head surround the rotatable tool. This makes it possible for material that accrues when processing a workpiece with the rotatable tool to be suctioned off on all sides. As an alternative, however, the suction head may also be configured as a simple opening that has a suitable shape for suctioning off material. Such a shape may be a slit, an oval or a circle for example. In this case, the suction head may be configured in a manner similar to that of a vacuum cleaner.

A negative pressure may be generated on the suction head by the fan, whereby air may be sucked in through the suction head. As a result, material such as dust, which is located in the vicinity of the suction head, may also be sucked in.

The suction head is especially advantageously connected to the fan by an intake channel, which runs in a first section along, in particular parallel to the longitudinal axis and in a second section along, in particular parallel to, the vertical axis. The intake channel very generally establishes a flow-related connection between the suction head and the fan. As a result, a negative pressure generated at the fan may produce a negative pressure at the suction head. In addition, air and material can be guided from the suction head to the fan. In a first section, the intake channel runs along a longitudinal axis of the suction module. In a preferred suction module, this type of longitudinal axis is the axis in which the suction module has its largest spatial extension. However, this is not absolutely required. The longitudinal axis may alternatively also be defined for example as an upper edge of the suction module, if the suction module is placed with a provided stop surface on a substrate. In any case, the intake channel runs at least in the first section along the longitudinal axis. The vertical axis is transverse to the longitudinal axis, which means for example, that the axes are at approximately a right angle to one another. For example, the two axes are at an angle of more than 45°, more than 70°, more than 80°, more than 85° or of exactly 90° to one another. If the suction module is configured such that it is situated with a bearing surface on a substrate and in this state a hand-held power tool is fastened above the suction module so that the suction module is essentially located between the substrate and the hand-held power tool, the vertical axis may be for example approximately perpendicular to the substrate. This means for example that it is at an angle of more than 45°, more than 70°, more than 80°, more than 85° or of exactly 90° to the substrate. In any case, the intake channel runs at least in the second section along the vertical axis.

In addition to the first section and the second section, the intake channel may also have additional sections which do not run along the longitudinal axis and the vertical axis. These types of sections may be arranged in front of the first section, between the first section and the second section and after the second section. For example, a curved section where the intake channel changes its direction may be arranged between the first section and the second section. Beyond the first section and the second section, the intake channel is basically not subject to any restrictions with respect to its progression.

Within the framework of an especially preferred further development, the fan axis is aligned transverse, in particular perpendicular, to a plane spanned by a first and second section of the intake channel. In addition to the advantages of the idea of the invention, this produces an especially advantageous compact relative arrangement of the fan and the intake channel.

Moreover, the suction module preferably has a motor, which can directly drive the fan around the fan axis in a rotating manner. As a result, it is possible to dispense with both a maintenance-prone gear as well as a complicated connection between the fan wheel and a motor in the hand-held power tool. However, as an alternative, the fan may also be driven by a motor in the suction module via a gear or by a connection with a motor in the hand-held power tool either with or without an intermediate gear.

In a preferred embodiment, a filter is arranged between the intake channel and the fan. Such a filter captures dust and other material in front of the fan at least as of a certain size. As a result, damage to the fan from suctioned parts that fall short of a certain maximum size may be prevented. In addition, the emission of dust particles to the ambient air may be prevented, thereby also preventing health hazards for operators or an explosion hazard for example.

If the suction module has a motor and a filter, the motor is preferably designed to be as short as possible and the air is guided via or through the motor that sits between the filter and the fan wheel. As a result, the motor comes into contact only with especially fine particles not yet separated by the filter.

An air channel is preferably arranged on the pressure side of the fan, which passes laterally by the filter. This makes an especially compact design possible.

The fan is preferably a radial fan. As a result, an especially good suction effect may be achieved. However, an axial fan may also be used as an alternative.

If the fan is a radial fan, an elbow is preferably arranged on the suction side of the fan for the axial supply of air. As a result, the air flowing by from the intake channel is guided directly to the inside of the fan wheel in order to then be blown away by the wheel radial. If the suction module has a filter, it is preferably arranged upstream from the elbow.

The idea of the invention also offers the basis for an air guidance that is especially beneficial for flow and requires construction space that is realizable in an especially compact manner, e.g., having a diffusor that is bladed or unbladed so it is beneficial for flow, in particular on a pressure side of the fan. The diffusor may extend advantageously either completely or partially both radially as well as axially with respect to the fan wheel in order to obtain the greatest possible pressure recovery after the fan wheel. The greatest possible pressure recovery may be obtained after the fan wheel with a pressure-side diffusor. In the process, the diffusor may be designed to be bladed or unbladed in a manner that is beneficial for flow. The diffusor may extend either completely or partially both radially as well as axially (with respect to the fan wheel). The diffusor preferably widens starting from the fan in a plane spanned by the longitudinal axis and the vertical axis. In this case, the diffusor has a walling, which lies at least partially in the plane spanned by the longitudinal axis and the vertical axis. The intersecting lies of the walling of the diffusor with this plane widen as viewed from the fan wheel. This makes a compact design possible, particularly when the diffusor is arranged on the side of the filter.

An outlet opening arranged on a narrow side of the suction module is preferably arranged on the pressure side of the fan, through which air may be released from the fan to an environment of the suction module. This makes an especially compact design and a guidance of the outlet air past the operator possible.

If the suction module has a diffusor, it is preferably arranged between the fan and the outlet opening. This may be realized for example in such a way that an outlet air channel continuously widens starting from the fan and then discharges into the outlet opening on the narrow side.

A hand-held power tool may preferably have a tool that is rotatable around a tool axis as well as a handgrip running along a grip axis, which may be clasped with a hand, wherein the hand-held power tool is connected to the suction module according to the invention. As a result, the suction module may suction away dust or other material that accrues when processing a workpiece with the hand-held power tool from the work area and prevent contamination, health hazards for operators or an explosion hazard.

The longitudinal axis in this case preferably runs parallel to the tool axis. In addition, the vertical axis is preferably in a plane with the grip axis. It is especially preferred that the vertical axis run parallel to the grip axis. With these types of constructions, it is possible to achieve an especially compact design of the system of the hand-held power tool and suction module.

In the case of a hand-held power tool, which is connected to a suction module according to the invention, the fan is preferably arranged on the sides of the longitudinal axis and the vertical axis facing away from the hand-held power tool in the plane spanned by the longitudinal axis and the vertical axis. In a normal case, this means that when the hand-held power tool is in the normal position, the suction module is situated beneath the hand-held power tool, and that the grip is located behind the suction module.

In the case of the hand-held power tool, we are dealing, for example, with a drill, a hammer drill or a combination hammer.

One exemplary embodiment of the invention is described in the following on the basis of the drawings. These drawings are not necessarily supposed to represent the exemplary embodiment to scale, rather the drawings are executed in a schematic or slightly distorted form when it is useful for explanatory purposes. Reference is made to the pertinent prior art with respect to additions to the teachings directly identifiable from the drawings. It must be taken into consideration in this case that a wide range of modifications and changes related to the form and detail of an embodiment can be undertaken without deviating from the general idea of the invention. The features of the invention disclosed in the description, in the drawings as well as in the claims may be essential for the further development of the invention both separately as well as in any combination. Moreover, all combinations of at least two features disclosed in the description, the drawings and/or the claims fall within the scope of the invention. The general idea of the invention is not restricted to the exact form or detail of the preferred embodiment described and depicted in the following or restricted to a subject matter, which would be limited as compared to the subject matter claimed in the claims. In the case of any dimensioning ranges given, values within the stated limits are also meant to be disclosed as limit values, and be applicable at will and claimable. For the sake of simplicity, the same reference numbers are used in the following for identical or similar parts having an identical or similar function.

Additional advantages, features and details of the invention are disclosed in the following description of the preferred exemplary embodiment as well as on the basis of the drawings.

DETAILED DESCRIPTION OF THE DRAWINGS

Figure 1:
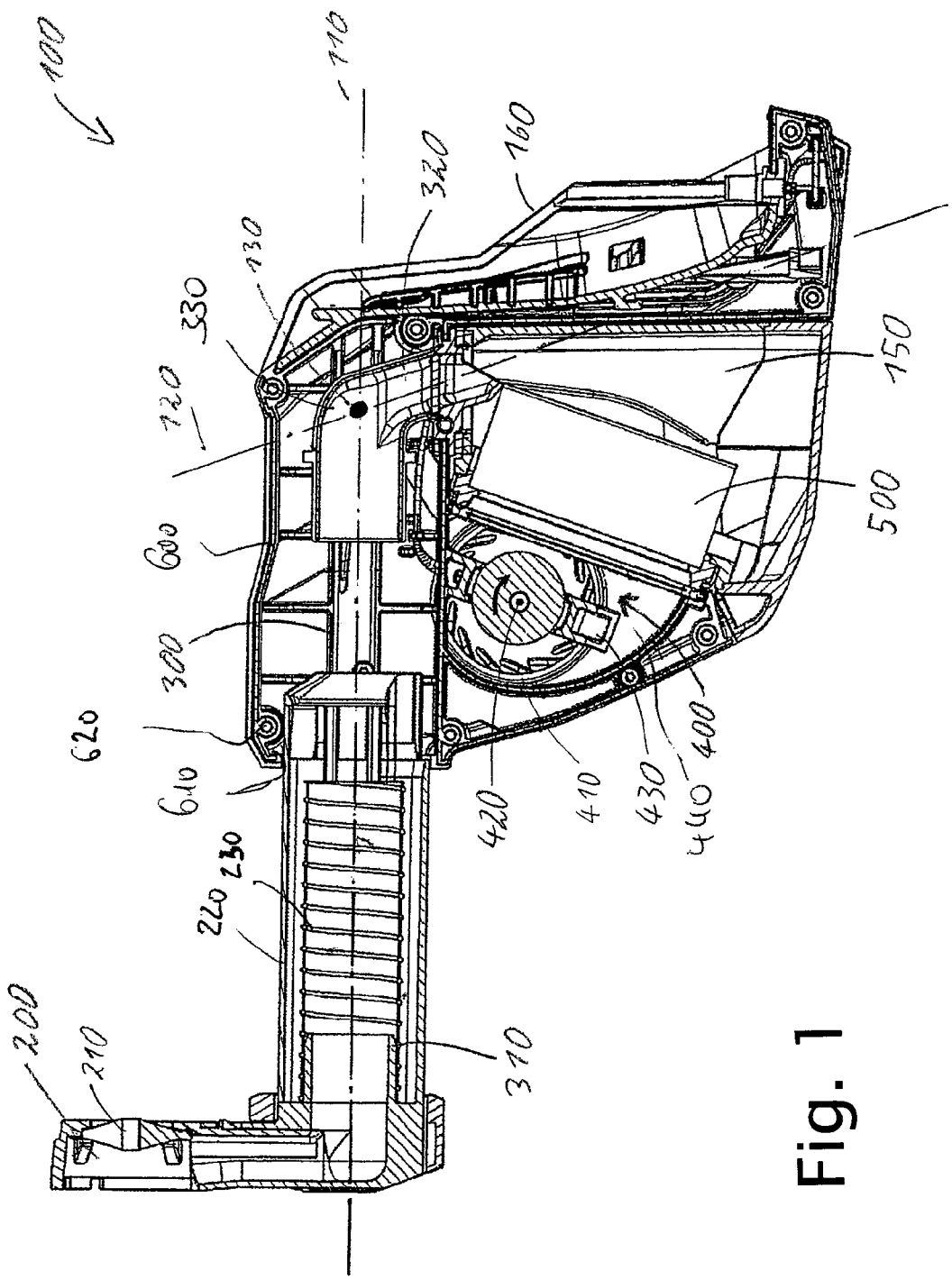
FIG. 1 shows an embodiment of a suction module in accordance with the principles of the present invention.

FIG. 1 depicts a suction module 100 having a longitudinal axis 110, a vertical axis 120 and a narrow axis 130.

A suction head 200 is located in the operating direction on a tool-side end of the suction module 100. The suction head 200 features an opening 210, through which a tool such as a drill bit may be inserted. Thus, the suction head 200 may suck away dust, material and particles, which accrue when processing a workpiece with an inserted tool. The suction head 200 is connected to a fan 400 via an intake channel 300. The intake channel 300 has a first section 310 and a second section 320. The first section 310 runs along the longitudinal axis 110 of the suction module. The second section 320 runs along the vertical axis 120 of the suction module.

Figure 2:
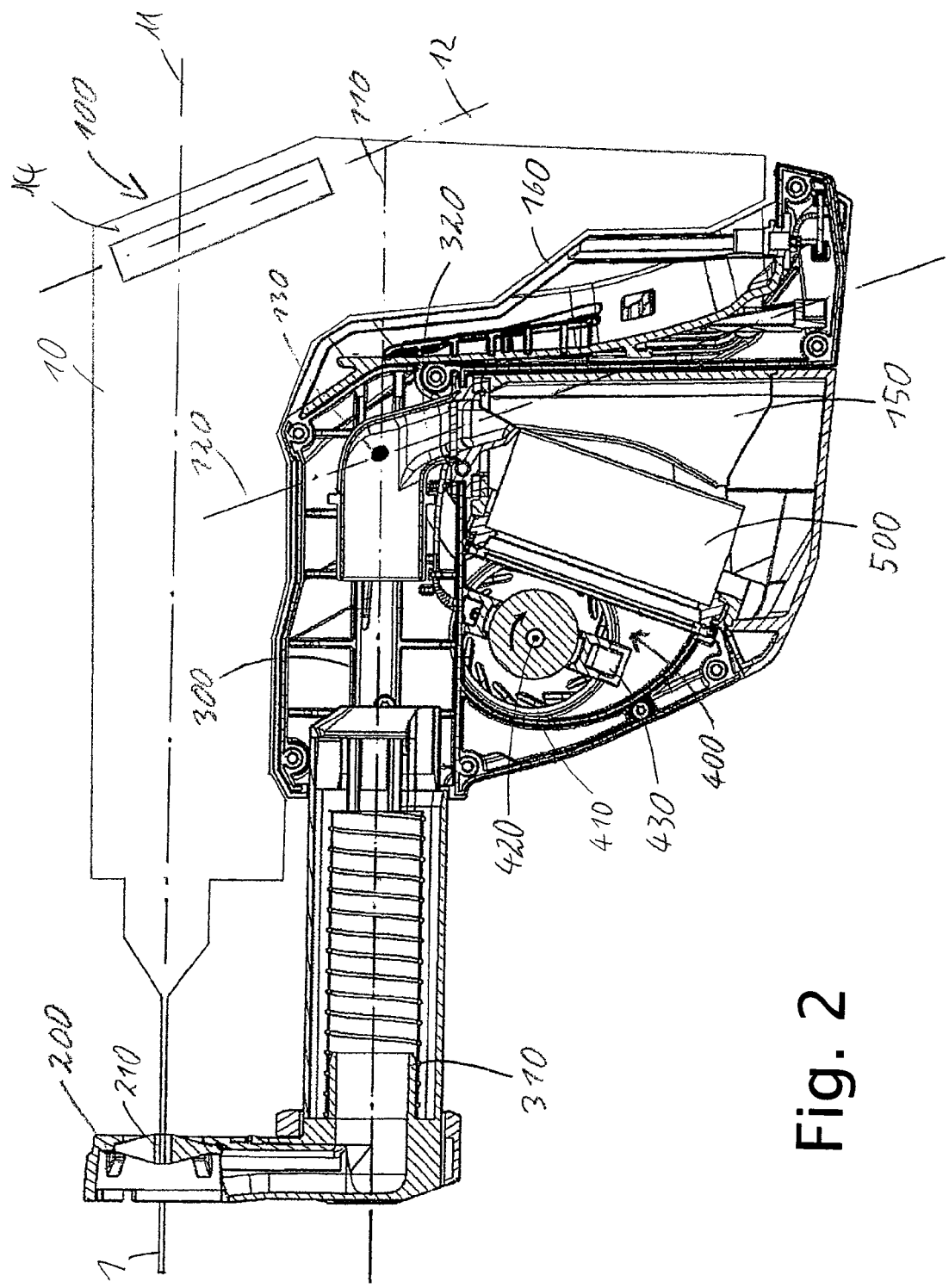
FIG. 2 shows in schematic form an embodiment of a hand-held power tool with a suction module of FIG. 1.

In the present embodiment, the first section 310 of the intake channel is formed partially in a suction head housing 220 continuing the suction head 200 in the direction of a suction housing 600 and partially in the fan housing—both forming the first section 310 of the housing area along the longitudinal axis 110 of the suction housing 600. The suction head housing 220 in this case is attached to the suction housing 600 so it can move along the longitudinal axis 110. Concretely, the suction head housing 220 with its elongated channel part for the first section 310 of the intake channel 300 is inserted moveably into an opening 610 and guided there with guide elements 620 in the direction of the longitudinal axis 110. In other words, the first section 310 of the intake channel 300 may be shortened or lengthened by the displaceable bearing of the suction head housing 220 in the suction housing 600. A shortening or lengthening may be adjusted depending upon the requirements of the operator or will adjust automatically, if, as shown in FIG. 2, a tool 1 is pressed into a substrate and therewith the suction head 200 is also pressed on the substrate adjacent to the suction head housing 220 in the fan housing. In order to guarantee a secure hold of the suction head 200 on the substrate, the suction head housing 220 in the present case is pre-stressed displaceably against the spring force of a spring 230; in other words, steadily pressed on the substrate with the suction head 200 by the spring force. Depending upon the processing length of the tool 100, a length of the first section 310 of the intake channel 300 therefore adjusts during the processing operation. The additional guidance of intake air in the intake channel 300 is accomplished in the present case via a deflection area 330 of the intake channel 300 in the second section 320. In the present case, the deflection area 330 adjusts an angle between the first section 310 and the second section 320 of approximately 90°, in the present case somewhat more than 90°, namely 110°. After the deflection area 330, the suctioned air is guided in the second section 320 to a filter 500.

Because of the present arrangement of the fan axis 420 of the fan wheel 410 parallel to the narrow axis 130 of the suction housing 600, it is possible to realize a comparatively great increase in a suction power, which cannot be realized with suction modules known until now. In doing so, the present embodiment of a suction module 100 of FIG. 1 prevents the outer dimensions of the suction housing 600 from having to be extended beyond the slimmest side of the hand-held power tool 10 depicted in FIG. 2 as a hammer drill and combination hammer. According to the idea of the invention, an arrangement has been found for the fan wheel 410 in the radial extension as well as the intake channel 300 together, which extends along the larger dimensions of the suction housing 600, namely along the longitudinal axis 110 and the vertical axis 120. In addition, according to the idea of the invention, the fan axis 420 is arranged running along, in the present case parallel, to the narrow axis 130 of the suction housing 600. In particular, here in the case of a suction module 100, the fan axis 420 of the fan wheel 410 is directly driven for one by an integrated motor 430, which sits on the fan axis 420, in other words, the fan axis 420 conforms essentially to the motor axis and is directly driven by the motor 430 as a motor shaft. Secondly, the fan axis 420 of the suction module 100 here sits transverse to a transverse axis of the motor of a hand-held power tool 10 depicted in FIG. 2. As a result, the fan axis 420 also runs along the narrow axis 130 of the hand-held power tool 10. In addition, according to the present embodiment, the arrangement of a filter 500 directly in front of the entrance to the fan 400 is possible. The filter 500 is arranged between the second section 320 of the intake channel 300 and the fan 400 through which the air flowing out of the intake channel passes before it enters the fan. As a result, coarser particles which could damage the fan are removed from the air flow. In addition, dust particles starting with the pore size of the filter may likewise be removed from the air flow, thereby preventing health hazards for operators or an explosion hazard.

The air flow exits from the filter 500 axially to a fan wheel 410 of the fan 400. It is a radial fan in the present case so that air must be suctioned axially. During operation, the fan rotates around a fan axis 420, wherein it is driven by a motor 430. The motor 430 is an electric motor in the present case.

The fan axis 420 runs parallel to the narrow axis 130. As a result, the fan wheel 410 extends in the radial direction along a wide side 150 of the suction module 100. The dimension of the fan wheel 410 may be provided in practice along the comparatively large extension of the wide side 150.

The narrow axis 130 in the present case runs parallel to the outer limitation of a narrow side 160 of the suction module 100. The narrow side 160 is designed in such a way that a hand-held power tool 10, such as, for example, a drill, a hammer drill or a combination hammer, can be placed on it on the suction module 100 and firmly fastened in a detachable manner.

Because of the arrangement of the motor 430 and of the fan wheel 410 lying on the common rotational axis/fan axis 420, the fan wheel and a pressure-side air guidance following the fan wheel may pass by laterally on the suction-side air guidance and on the filter 500, for example a removable box. The dimensions of the fan wheel 410 and the following pressure-side air guidance are no longer determined by the smallest dimension of the hammer drill or combination hammer, rather are limited by a surface which is spanned by the length of the striking mechanism and the grip 14. The latter allows for a much larger blower wheel or fan diameters and larger pressure-side air guidance, which makes it possible to slow down the air exiting from the fan.

In addition, because of the special arrangement of the filter 500, motor 430 and fan wheel 410, a compact arrangement is obtained that minimizes the housing volume of the suction housing 600, which is characterized for one by shorter suction-side air paths to the filter 500 or to the fan wheel 410 and secondly by only a few sharp changes in direction. As a result of this as well as due to an air guidance that is as constant as possible, flow losses may be minimized substantially.

In addition, the pressure-side air guidance may be configured in the form of a diffusor 440 that is bladed or unbladed so it is beneficial for flow, which may extend either completely or partially both radially as well as axially with respect to the fan wheel 410 in order to obtain the greatest possible pressure recovery after the fan wheel 410 and doing so with a very compact design.

Ideally, the motor 430 is designed to be as short as possible and the air is guided over or through the motor 430, which sits between the filter 500 and fan wheel 410. As a result, the motor 430 comes into contact only with ultra-fine particles not yet separated by the filter 500.

FIG. 2 shows, provided with a corresponding advantage, a system of a hand-held power tool 10 with a suction module 100 having a suction housing 600. The suction module 100 is detachably fastened on the hand-held power tool 10 such that the longitudinal axis 110 of the suction housing 600 runs along, in the present case parallel to, the tool axis 11 of the tool 1 and the vertical axis 120 of the suction housing 600 lies in a plane with the grip axis 12 of the grip 14; namely, in this case runs along, i.e., parallel to, the grip axis 12. The suction module 100 is arranged by the suction housing 600 in a plane spanned by the tool axis 11 and the grip axis 12. In the present case, the suction housing 600 is fastened beneath and in front of the hand-held power tool 10; in other words, the hand-held power tool 10 sits laterally above the suction module 100. Concretely, in the present case, the aforementioned spanned plane lies in the operating direction of the tool axis 11 beneath the tool axis 11 and against the operating direction in front of the grip axis 12.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A hand-held power tool, comprising:
   a suction module, wherein the suction module includes:
     a suction head;
     a suction housing;
     a fan disposed within the suction housing, wherein air from the suction head is suctionable by the fan and wherein the fan has a fan wheel that is rotatable around a fan axis;
     wherein the suction housing has a longitudinal axis, a vertical axis fixed transverse to the longitudinal axis, and a narrow axis having a smaller dimension than the longitudinal axis and the vertical axis, wherein the narrow axis is aligned transverse to the longitudinal axis and transverse to the vertical axis;
     and wherein the fan axis runs parallel to the narrow axis;
   a tool receptacle for receiving a tool that is rotatable around a tool axis; and
   a grip that runs along a grip axis;
   wherein the longitudinal axis of the suction housing runs parallel to the tool axis and wherein the vertical axis of the suction housing lies in a plane with the grip axis.

2. The hand-held power tool according to claim 1, wherein the vertical axis runs along the grip axis.

3. The hand-held power tool according to claim 1, wherein the suction module is arranged in a plane spanned by the tool axis and the grip axis, wherein the plane spanned by the tool axis and the grip axis lies in an operating direction of the tool axis beneath the tool axis, and against the operating direction in front of the grip axis.

4. The hand-held power tool according to claim 1, wherein the suction head is connected to the fan by an intake channel which runs in a first section along the longitudinal axis and in a second section along the vertical axis.

5. The hand-held power tool according to claim 4, wherein the fan axis is aligned transverse to a plane spanned by the first and the second section of the intake channel.

6. The hand-held power tool according to claim 1, wherein the fan wheel is directly drivable around the fan axis by a motor.

7. The hand-held power tool according to claim 6, wherein the fan axis is an axis of the motor.

8. The hand-held power tool according to claim 4, further comprising a filter that is disposed between the second section of the intake channel and the fan.

9. The hand-held power tool according to claim 8, wherein suction air is supplyable between the filter and fan via a motor.

10. The hand-held power tool according to claim 1, wherein the fan is a radial fan and includes an elbow attached on a suction side of the fan.

11. The hand-held power tool according to claim 8, wherein an outlet channel attached on a pressure side of the fan passes laterally by the filter at an area of the narrow axis.

12. The hand-held power tool according to claim 8, wherein the filter is disposed in a replaceable housing box.

13. The hand-held power tool according to claim 1, further comprising a diffusor attached on a pressure side of the fan and leading to an outlet channel, wherein a cross-section of the diffuser widens starting from the fan and in an outlet direction towards the outlet channel, wherein the outlet direction lies in a plane spanned by the longitudinal axis and the vertical axis.

14. The hand-held power tool according to claim 13, wherein the diffusor is unbladed.

15. The hand-held power tool according to claim 1, wherein an outlet opening of an outlet channel attached on a pressure side of the fan is disposed on a narrow side of the suction housing, and wherein air is releasable from the fan to an environment of the suction module through the outlet opening.

\* \* \* \* \*